2,779,737

COMPLEX CALCIUM SALTS OF OXIDIZED PETROLEUM OILS AND PROCESS FOR PREPARING THE SAME

Emil Koft, Jr., Woodbury Heights, and John W. Schick, Camden, N. J., assignors to Socony Mobil Oil Company, Inc., a corporation of New York No Drawing. Application December 29, 1954, Serial No. 478,495

9 Claims. (Cl. 252—39)

This invention is concerned with the production of complex calcium salts of oxidized petroleum oils and to a method for preparing these salts. It also contemplates the use of these salts as detergents in mineral lubricating oils.

In a copending application, Serial No. 441,626, filed July 6, 1954, there is disclosed and claimed a method for the preparation of certain complex metal salts of oxidized oils. That method involves the oxidation of the oil in the presence of a defined excess of metal hydroxide reagent. Thus, the metal hydroxide reagent, in amounts ranging from about 2% to about 25%, by weight, was charged to the oil prior to the oxidation. The oxidation was then conducted to an extent sufficient to cause from about 5% to about 85% of the charged metal hydroxide to react with the oil. Thus, an excess of about 15% and up to about 95% of the metal hydroxide was present in the oil throughout the course of the oxidation. The products thus produced contained about 2 equivalents of metal per equivalent of acid-hydrogen formed in the oxidation, i. e., their metal contents were approximately twice that of the so-called normal salts or soaps of oxidized oils. Thus, when a product, produced by the process of that application and having a content of 1.50% calcium, was demetallized by means of hydrochloric acid, the resulting acidic product had a neutralization number (N. N.) of 21 and a saponification number (after the N. N. had been subtracted from the saponification number) of 18. This neutralization number would account for only 50% of the calcium, assuming the formation of neutral calcium salts. This indicates that the remaining 50% of the calcium was present in the product as some type of complex or coordination compound. These products were described to be detergents for mineral lubricating oils.

In another copending application, Serial No. 441,650, filed July 6, 1954, it is disclosed and claimed that oxidized oil products produced by the oxidation of an oil in the presence of an excess of metal hydroxide, such as those disclosed in Serial No. 441,626, can be reacted further with metal hydroxides to incorporate additional amounts of metal therein. Thus, it was found that such a reaction will take place in the presence of water under certain conditions. Specifically, it was found that this reaction, which was termed the "water-complexing reaction" can be made to occur by adding water to a mixture comprising the metal-containing oxidized oil product and the metal hydroxide reagent and then causing the reaction mixture to be substantially completely dehydrated. The dehydrated reaction mixture was then filtered to provide the final product.

As disclosed in Serial No. 441,650, the products produced by the water-complexing step contain substantially higher amounts of metal than the straight oxidized oil products shown in Serial No. 441,626. In particular, when the calcium hydroxide was used as the metal hydroxide reagent for the water-complexing step, the metal content of the oxidized oil was increased up to 54%. Since the water-complexing reaction is conducted in the absence of further oxidation of the oil, i. e., after the oxidation step has been completed, it will be appreciated that the products thus produced contain a greater number of equivalents of metal than the straight oxidized oil products, based on the amount of acid-hydrogen formed in the course of the oxidation. Thus, on the basis of their metal contents, the water-complexed calcium products provided by the use of calcium hydroxide as the water-complexing metal hydroxide reagent contain up to about 3 equivalents of calcium. It was disclosed that these higher calcium content products are consistently better detergents, on a weight for weight basis, than the straight oxidized oil products.

In accordance with the present invention, it has now been found that when the water-complexing reaction is carried out on a calcium-oxidized oil product of the type disclosed in Serial No. 441,626 utilizing calcium chloride or calcium hypochlorite as the water-complexing reagent, the increase in the calcium content of the oxidized oil product is unexpectedly greater than that obtained using calcium hydroxide as the water-complexing reagent. Thus, it has been found that the use of calcium chloride as the water-complexing reagent increases the calcium content of the oxidized oil product by about 66%, while calcium hypochlorite provides an increase of about 77%. Still more surprisingly, it has been found that when a mixture of calcium chloride and calcium hydroxide is used as the water-complexing reagent, the calcium content of the oxidized oil product is increased by about 82%. The products produced by the invention, therefore, contain from about 3.35 to about 3.65 equivalents of calcium, as compared to 3 equivalents, which represents the highest amount of calcium incorporated into the oxidized oil products by the use of calcium hydroxide, per se, as the water-complexing reagent.

As far as is known, high calcium content oxidized oil products of the character provided by this invention have not been known heretofore and these products, therefore, are believed to be new compositions of matter. Since the exact chemical formula of these new products has not been presently determined, however, they are defined herein by means of their method of preparation. It has been found that these high metal content products are superior oil detergents, on a weight for weight basis, than the corresponding calcium hydroxide water-complexed oxidized oil products.

It is, therefore, the primary object of this invention to provide a new class of complex calcium salts of oxidized oils. A further object is to provide a process for the preparation of these new products. A still further object is to provide high detergency lubricating oil compositions containing small amounts of these new high calcium content oxidized oil products. Other and further objects of the invention will be apparent from the following description thereof.

It will be seen that, broadly, the present invention provides a process for the preparation of a novel class of high calcium content complex calcium salts of oxidized petroleum oils which comprises the steps of (1) oxidizing a petroleum oil in the presence of from about 2% to about 25%, by weight, of calcium hydroxide to an extent sufficient to incorporate from about 5% to about 85% of the calcium hydroxide into the oil (2) reacting the product thus obtained with a calcium salt reagent selected from the group consisting of calcium chloride, calcium hypochlorite and a mixture of calcium chloride and calcium hydroxide, in the presence of water, to incorporate an additional amount of calcium into the said product, (3) dehydrating the mixture and (4) subjecting the reaction mixture obtained in step (3) to filtration to obtain the final product.

In practicing the invention, calcium hydroxide, in an amount ranging from about 2% to about 25%, by weight, is mixed with the oil prior to the start of the oxidation. Although higher amounts of calcium hydroxide may be used, they are generally undesirable from the standpoint of fluidity of the reaction mass and subsequent filtration. To avoid such difficulties in any case, however, a diluent solvent, such as benzene, toluene or the like, may be added to the reaction mixture and then subsequently removed.

The oxidation step of the process is carried out by heating the reaction mixture to a temperature of from about 250° F. to about 600° F. and preferably from about 350° F. to about 450° F. while passing an oxidizing gas, such as air or oxygen, therethrough. The oxidation is continued for a time sufficient to effect the reaction of at least about 5%, but not more than about 85%, of the charged calcium hydroxide. After the oxidation step has been completed, the water-complexing step is carried out.

To conduct the water-complexing using calcium chloride or calcium hypochlorite as the complexing reagent, the reaction mixture from the oxidation step is filtered to remove unreacted calcium hydroxide and cooled to a temperature below the boiling point of water. The calcium chloride or calcium hypochlorite reagent and water, generally as a water solution of the reagent salt, is then added to the filtrate. The whole is then heated to a temperature substantially above the boiling point of water and maintained at this temperature until the water has been substantially completely removed. The resulting material is then filtered to obtain the final product.

Where it is desired to conduct the water-complexing reaction using a reagent comprising both calcium chloride and calcium hydroxide, the calcium chloride and water may be added directly to the cooled, unfiltered reaction mixture (containing unreacted calcium hydroxide) from the oxidation step; or the reaction mixture may be filtered and cooled and calcium chloride, calcium hydroxide and water added thereto. When the former procedure is used, the amount of calcium chloride added should be at least about one-third of the amount of unreacted calcium hydroxide present in the reaction mixture. With the latter procedure, on the other hand, the calcium chloride added should comprise at least about 25 weight percent of the total of the calcium chloride and calcium hydroxide added. Thus, the mixed calcium chloride-calcium hydroxide water-complexing reagents contemplated herein should in all cases comprise at least about 25% calcium chloride in order for the higher calcium content products contemplated herein to be obtained. The complexing reaction which occurs in the presence of such mixtures involves both the calcium chloride and the calcium hydroxide, the resulting products often containing more metal than would be incorporated due to the calcium chloride alone as indicated by the chlorine analysis of the products.

For the water complexing step the amount of calcium containing salt reagent present in the reaction mixture should in any case be at least about 2%, and may suitably be as high as about 25%, based on the weight of the oxidized oil product used in the complexing step. This latter amount will not be significantly different from the weight of the oil originally charged to the oxidation where the entire oxidized oil product is used for the complexing step, since the amount of calcium incorporated by the oxidation in any case amounts to only about 1% or 2%. Here again, as in the oxidation step, a diluent solvent may be used, if necessary.

The amount of water required for the complexing step is generally small, about 2% to about 10%, by weight, of the oxidized oil product generally being sufficient. However, larger amounts, up to as high as 50%, or more, may be used without harmful effect, but the use of large amounts of water unnecessarily prolongs the dehydration time. The dehydration is ordinarily accomplished by heating the reaction mixture while passing a stream of nitrogen therethrough, the mixture being heated initially to 200° F. to 210° F. and the temperature being gradually increased up to about 325° F. to 400° F. as the rate of the water removal decreases. The product is generally filtered at or near this latter temperature level in order to provide relatively rapid filtration. The dehydration may, however, be accomplished in other ways. Thus, a solvent, such as benzene, may be added and the water driven off as an azeotropic mixture.

It will be appreciated that the time required for the oxidation step will depend upon several factors, such as the temperature of the reaction, the type of oil stock employed, the rate of introduction of the oxidizing gas and the efficiency of the contacting of the oxidizing gas with the oil all affect the oxidation time. It will be seen, however, that the proper oxidation time in any case will be that which provides for the utilization of the required amount of the calcium hydroxide, as above defined. Thus, the proper time can be determined by conducting several oxidations for different periods of time, while maintaining the other reaction variables constant and noting the amount of calcium hydroxide utilized in each instance. As will be seen from the examples presented hereinafter, the oxidation time may vary over a relatively wide range, depending upon the reaction conditions employed. From a practical standpoint, it is, of course, ordinarily desirable to utilize reaction conditions which are conducive to effecting the oxidation to the required extent in the shortest possible period of time. Accordingly, it is considered that modifications designed to increase the efficiency of the oxidation, such as the use of known oxidation catalysts, special reactors, etc., are clearly within the spirit and scope of this invention.

The oil to be oxidized may be any petroleum oil of light, medium or heavy grade, the chief limiting factor with respect thereto being the solubility in oil of the resulting product, as these products are contemplated particularly for use as detergents for lubricating oils. Generally, suitability from this standpoint requires that the oil have an average molecular weight of at least about 300. However, heavier oils having molecular weights of from about 600 up to about 1000 are particularly suitable. The use of conventionally refined oils having molecular weights in the latter range are especially preferred from the standpoint of solubility in oil of the resulting products. In terms of viscosity, oils having viscosities ranging from about 20 to 300 S. U. V. at 210° F. may be used, with those of from about 100 to 200 S. U. V. at 210° F. being preferred. The characteristics of several highly suitable oil stocks are shown in Table I.

TABLE I
Properties of oil stocks

| Oil Type | Specific Grav. 60/60 | API Grav. | Aniline Pt., °C. | Avg. Mol. Wt. | Percent S | SUV (Sec.) 100° F. | SUV (Sec.) 210° F. | V. I. | Flash, °F. |
|---|---|---|---|---|---|---|---|---|---|
| Percolated Mid-continent Bright Stock | 0.8996 | 25.8 | 119.2 | 720 | 0.7 | 1,848 | 123.8 | 94 | 525 |
| Unpercolated Mid-continent Bright Stock | 0.8950 | 26.6 | 121.2 | 880 |  | 1,903 | 125.5 | 93.5 |  |
| East Texas Hvy. Waxy Dist. Stock |  | 26.9 |  | 470 | 0.24 | 619 | 66.8 | 85 | 495 |

To further illustrate the process of the invention and to show the outstanding ability of the products provided by the invention as detergents for mineral lubricating oils, the following examples and test results are presented.

Example 1(a)

Five thousand grams of a percolated solvent-refined, Mid-continent type bright stock and 1000 grams (20 weight percent) of calcium hydroxide were charged to a 3-liter, round-bottomed, four-necked flask equipped with a stirrer, thermometer and 6 medium-grained filter sticks for introduction and dispersion of air. Forty liters of air per filter stick per hour were bubbled through the oil maintained at a temperature of about 375° F. over a period of 78 hours. The oxidation was then stopped. The reaction mixture was then stirred with 50 grams of "Hyflo" (a diatomaceous earth filter aid), filtered and cooled. The filtrate contained 1.57 weight percent of calcium, had a potentiometric base number of 13 and a kinematic viscosity at 210° F. of 164.5.

Example 1(b)

Five hundred grams of the filtered product of Example 1(a), 100 cc. of toluene and a solution of 100 grams of calcium chloride in 150 cc. of water were charged to a flask reactor equipped with a stirrer, a thermometer, an inlet tube for stripping gas and a water take-off. The reaction mixture was held at 158° F. for two hours. The water and toluene were then stripped from the reaction mixture with a stream of nitrogen while the temperature was gradually raised to 340° F. The reaction mixture was then stirred with 4 weight percent of "Hyflo" filter aid and filtered hot. The filtrate contained 2.61 weight percent of calcium which represents a 66% increase over that of the straight oxidized oil product of Example 1(a). The product also contained 2.46 weight percent of chlorine and had a potentiometric base number of 10.

Example 2(a)

Two thousand grams of an unpercolated, solvent-refined, Mid-continent type short bright stock and 435 grams (21.7 weight percent) of calcium hydroxide were charged to an electrically heated column reactor (60 inches in length and 3 inches in diameter) equipped with a fritted glass plate sealed in the bottom. Sixty liters per hour of air was passed up through the oil, maintained at a temperature of about 400° F., for 30 hours. A small sample of the reaction mixture was then taken and filtered. The filtrate analyzed 1.44 weight percent of calcium. The calcium reactor used in this example provides a much more efficient use of the oxidizing gas than the flask reactor utilized in Example 1(a), so that the time of oxidation is considerably shorter.

Example 2(b)

To the cooled, unfiltered reaction mixture of Example 2(a) there was added 800 grams of a 37.5 weight percent aqueous calcium chloride solution. The calcium chloride thus added, i. e., 300 grams, amounted to approximately 44 weight percent of the total of the calcium chloride and the unreacted calcium hydroxide present in the reaction mixture. Nitrogen was bubbled through the reaction mixture and the water stripped out at 260° F. over a period of about 16 hours. The temperature was then raised to 400° F. and maintained there for one-half hour. The reaction mixture was then contacted with 4 weight percent of "Hyflo" and filtered hot. The filtered product contained 2.63 weight percent of calcium and 1.0 weight percent of chlorine. It had a potentiometric base number of 38 and a kinematic viscosity of 210° F. of 135.3. The calcium content of the product represents an 82.6% increase over that of the oxidized oil product of Example 2(a).

Example 3(a)

An oxidation reaction was conducted using the column reactor and the same conditions employed in Example 2(a), except that only 218 grams of calcium hydroxide was used and the oxidation time was 24 hours. A sample of the reaction mixture after oxidation was taken and filtered. The filtrate contained 1.67 weight percent of calcium and had a potentiometric base number of 13.

Example 3(b)

Six hundred grams of a 16 weight percent aqueous calcium chloride solution was added to the cooled, unfiltered reaction mixture of Example 3(a). The calcium chloride thus added amounted to approximately 30.6 weight percent of the total of the calcium chloride and calcium hydroxide available for reaction. The dehydration and filtering steps were conducted after the fashion of Example 2(b). The filtered product contained 2.8 weight percent of calcium and had a potentiometric base number of 23. The calcium content of the product represents a 70% increase over that of the oxidized oil product.

Example 4(a)

The oxidation step of this example was conducted in the same manner as in Example 2(a), except that the oxidation time was 24 hours. A small portion of the resulting product was filtered and found to contain 1.65 weight percent of calcium.

Example 4(b)

Five hundred milliliters of water were added to the cooled (200° F.) unfiltered, reaction mixture (containing about 18.5 weight percent of calcium hydroxide) in the column reactor. The dehydration and recovery of the product was carried out just as in Example 2(b). The filtered product contained 1.89% weight percent of calcium.

Example 5(a)

Eight hundred grams of an unpercolated, solvent-refined, Mid-continent type short bright stock and 157 grams of calcium hydroxide were charged to a column reactor similar to that used in Example 2(a). Twenty liters of air per hour were bubbled up through the oil at 425° F. for 25 hours. The reaction mixture was then contacted with 4 weight percent of "Hyflo" filter aid and filtered hot. The filtrate analyzed 1.80 weight percent of calcium.

Example 5(b)

One hundred and fifty grams of the filtered product from Example 5(a), 100 cc. of toluene and a solution of 30 grams of calcium hypochlorite in 100 cc. of water were charged to a flask type reactor equipped with a stirrer, thermometer and a reflux condenser. The reaction mixture was refluxed for 3 hours at 210° F. to 220° F. Water and solvent were removed by topping to 280° F. using a nitrogen sweep. The reaction mixture was then contacted with "Hyflo" and 100 cc. of toluene and filtered while hot. The solvent was then removed under reduced pressure. The filtrate contained 3.20 weight percent of calcium and 3.35 weight percent of chlorine. The calcium content of the product (filtrate) was 77% greater than that of the oxidized oil product of Example 5(a).

DETERGENT ABILITY

As stated previously, the high calcium content oxidized oil products provided by this invention are excellent motor oil detergents and they are more effective detergents, on a weight for weight basis, than the products produced by the water-complexing of the straight oxidized oils using calcium hydroxide alone as the water complexing reagent. This is illustrated by the test data presented in Table II. In this table are shown the results of engine tests conducted on oil blends prepared from both types of products, Examples 1(b) and 4(b). The test used was the CFR Diesel D-21 Detergency Test which is described below. The base oil used in all of the tests was an SAE 30 grade, solvent-refined, Mid-continent oil having a kinematic viscosity at 100° F. of 121 and at 210° F. of 13.2. The additives were compared on an equivalent calcium basis, i. e., the oil blends all contained 0.088% of calcium.

DIESEL ENGINE TEST

This test determines the effectiveness of the lubricating oil in preventing piston deposits. A single cylinder, CFR, 4-cycle, super-charged, Diesel engine is used. The operating conditions are as follows:

Oil temperature_____° F__ 175
Jacket temperature_____° F__ 212
Speed _____R. P. M__ 1800
Brake load_____H. P__ 7.5

Oil addition every 8 hours starting at 4 hours (1½ gas. sample used)

The duration of the test is 60 hours. The detergent ability of the oil is reported in terms of overall piston cleanliness. Cleanliness ratings are based on a scale of from 100 to 0, a 100 rating signifying a perfectly clean condition and a 0 rating representing the worst possible deposit condition.

It will be seen from the data in Table II that the oil containing the calcium chloride-water-complexed oxidized oil product of Example 1(b) gave a detergency rating of 89, while the oil blend of the calcium hydroxide-water-complexed product of Example 4(b) gave a rating of 87, but the amount of the former product added to the oil was considerably less than that of the latter product. The former product is, therefore, a much more powerful detergent, on a weight for weight basis, than the latter product. The test data show further that the straight metal-oxidized oil products (i. e., not water-complexed) of Examples 1(a) and 4(a) are also effective detergents, but that they are, in turn, less powerful, on a weight for weight basis, than the calcium hydroxide-water-complexed oxidized oil product.

It will be appreciated that the products of the invention are actually oil solutions of the complex calcium oxidized oils and although the products shown in the examples presented herein vary with respect to their complex salt contents, it will be understood that these differences can be eliminated by standardization of process procedure and also, when required, by distillation of a portion of the oil therefrom. The amount of product required to be added to lubricating oil to provide the desired increase in the detergent ability thereof, therefore, will vary depending upon the process conditions utilized in preparing the particular products. In general, however, the amount of the product to be utilized will range from about 1% to about 10%, by weight, the usual amount being from about 2% to about 5%.

The products of the invention may also be added to oils containing other additives designed to improve the various characteristics thereof, such as anti-oxidants, pour point depressants, viscosity index improvers, defoamants, rust preventives, etc.

Although the products of the invention are intended primarily for use as detergents for lubricating oils, they are also utilizable for many of the purposes for which metal salts of organic acids are used, e. g., as components in coating compositions, paint driers, detergent soaps, dispersants, rust-preventive compositions, etc.

Although the invention has been described herein by means of certain specific embodiments and illustrative examples, it is not intended that it be limited in any way thereby, but only as indicated in the accompanying claims.

TABLE II

*Diesel engine test*

| Product Added to Oil | Complexing Reagent | Percent Metal in Product | Percent Product in Oil | Cleanliness Rating |
| --- | --- | --- | --- | --- |
| None | | | | 62 |
| Ex. 1 (a) | None | 1.57 | 5.6 | 83 |
| Ex. 1 (b) | $CaCl_2$–$H_2O$ | 2.61 | 3.53 | 89 |
| Ex. 4 (a) | None | 1.65 | 5.33 | 88 |
| Ex. 4 (b) | $Ca(OH)_2$–$H_2O$ | 1.89 | 4.66 | 87 |

What is claimed is:

1. A method of preparing a complex calcium salt of an oxidized petroleum oil which comprises (1) forming a mixture comprising (a) a petroleum oil having an average molecular weight of from about 300 to about 1000 and (b) from about 2% to about 25%, based on the weight of said oil, of calcium hydroxide, (2) contacting said mixture with an oxidizing gas at a temperature of from about 250° F. to about 600° F., to effect oxidation of said oil and reaction of the calcium hydroxide with the oxidized oil, (3) continuing said oxidation for a time sufficient to effect the reaction of from about 5% to about 85% of the calcium hydroxide with the oxidized oil, (4) providing a mixture comprising (a) the oxidized oil-calcium hydroxide reaction product from step 3, (b) from about 2.0% to about 25%, based on the weight of the oxidized oil-calcium hydroxide reaction product from step 3, of a calcium salt reagent, selected from the group consisting of calcium chloride, calcium hypochlorite and a mixture of calcium chloride and calcium hydroxide containing at least about 25% of calcium chloride and (c) water, at a temperature below the boiling point of water, (5) substantially completely dehydrating the mixture provided in step 4, and (6) subjecting the dehydrated mixture to filtration to separate the complex calcium salt product.

2. A method for preparing a complex calcium salt of an oxidized petroleum oil which comprises (1) forming a mixture comprising (a) a petroleum oil having an average molecular weight of from about 300 to about 1000 and (b) from about 2% to about 25%, based on the weight of said oil, of calcium hydroxide, (2) contacting said mixture with an oxidizing gas at a temperature of from about 250° F. to about 600° F., to effect oxidation of said oil and reaction of said calcium hydroxide with the oxidized oil, (3) continuing said reaction for a time sufficient to effect the reaction of from about 5% to about 85% of said calcium hydroxide with the oxidized oil, (4) adding water and calcium chloride to the resulting reaction mixture at a temperature below the boiling point of water to provide a mixture comprising (a) the oxidized oil-calcium hydroxide reaction product from step 3, (b) from about 2.0% to about 25%, based on the weight of the oxidized oil-calcium hydroxide product from step 3, of a calcium salt reagent consisting of calcium chloride and calcium hydroxide and comprising at least about 25% of calcium chloride and (c) water, (5) substantially completely dehydrating the mixture provided in step 4, and (6) subjecting the dehydrated mixture to filtration to separate the complex calcium salt product.

3. A method for preparing a complex calcium salt of an oxidized petroleum oil which comprises (1) forming a mixture comprising (a) a petroleum oil having an average molecular weight of from about 300 to about 1000 and (b) from about 2% to about 25%, based on the weight of said oil, of calcium hydroxide, (2) contacting said mixture with an oxidizing gas at a temperature of from about 250° F. to about 600° F., to effect oxidation of said oil and reaction of said calcium hydroxide with the oxidized oil, (3) continuing said reaction for a time sufficient to effect the reaction of from about 5% to about 85% of the calcium hydroxide with the oxidized oil, (4) subjecting the resulting reaction mixture to filtration to remove unreacted calcium hydroxide therefrom, (5) adding to the filtrate from step 4, water and from about 2.0% to about 25% of calcium chloride, based on the weight of said filtrate from step 4, at a temperature below the boiling point of water, (6) substantially completely dehydrating the mixture from step 5 and (7) subjecting the dehydrated mixture to filtration to separate the complex calcium salt.

4. A method for preparing a complex calcium salt of an oxidized petroleum oil which comprises (1) forming a mixture comprising (a) a petroleum oil having an average molecular weight of from about 300 to about 1000 and (b) from about 2% to about 25%, based on the weight of said oil, of calcium hydroxide, (2) contacting said mixture with an oxidizing gas at a temperature of from about 250° F. to about 600° F., to effect oxidation of said oil and reaction of said calcium hydroxide with the oxidized oil, (3) continuing said reaction for a time sufficient to effect the reaction of from about 5% to about 85% of the calcium hydroxide with the oxidized oil, (4) subjecting the resulting reaction mixture to filtration to remove unreacted calcium hydroxide therefrom, (5) adding to the filtrate from step 4, water and from about 2.0% to about 25% of calcium hypochlorite, based on the weight of said filtrate from step 4, at a temperature below the boiling point of water, (6) substantially completely dehydrating the mixture from step 5 and (7) subjecting the dehydrated mixture to filtration to separate the complex calcium salt.

5. A method for preparing a complex calcium salt of an oxidized petroleum oil which comprises (1) forming a mixture comprising (a) a petroleum oil having an average molecular weight of from about 600 to about 1000 and (b) from about 2% to about 25%, based on the weight of said oil, of calcium hydroxide, (2) contacting said mixture with an oxidizing gas at a temperature of from about 350° F. to about 450° F., to effect oxidation of said oil and reaction of said calcium hydroxide with the oxidized oil, (3) continuing said reaction for a time sufficient to effect the reaction of from about 5% to about 85% of said calcium hydroxide with the oxidized oil, (4) adding water and calcium chloride to the resulting reaction mixture at a temperature below the boiling point of water to provide a mixture comprising (a) the oxidized oil-calcium hydroxide reaction product from step 3, (b) from about 2% to about 10% by weight of water and (c) from about 2.0% to about 25%, based on the weight of the oxidized oil-calcium hydroxide product from step 3, of a calcium salt reagent consisting of calcium chloride and calcium hydroxide and comprising at least about 25% of calcium chloride, (5) substantially completely dehydrating the mixture provided in step 4 and (6) subjecting the dehydrated mixture to filtration to separate the complex calcium salt product.

6. A method for preparing a complex calcium salt of an oxidized petroleum oil which comprises (1) forming a mixture comprising (a) a petroleum oil having an average molecular weight of from about 600 to about 1000 and (b) from about 2% to about 25%, based on the weight of said oil, of calcium hydroxide, (2) contacting said mixture with an oxidizing gas at a temperature of from about 350° F. to about 450° F., to effect oxidation of said oil and reaction of said calcium hydroxide with oxidized oil, (3) continuing said reaction for a time sufficient to effect the reaction of from about 5% to about 85% of the calcium hydroxide with the oxidized oil, (4) subjecting the resulting reaction mixture to filtration to remove unreacted calcium hydroxide therefrom, (5) adding to the filtrate from step 4, from about 2% to about 10% of water and from about 2.0% to about 25% of calcium chloride, based on the weight of said filtrate from step 4, at a temperature below the boiling point of water, (6) substantially completely dehydrating the mixture from step 5 and (7) subjecting the dehydrated mixture to filtration to separate the complex calcium salt.

7. A method for preparing a complex calcium salt of an oxidized petroleum oil which comprises (1) forming a mixture comprising (a) a petroleum oil having an average molecular weight of from about 600 to about 1000 and (b) from about 2% to about 25%, based on the weight of said oil, of calcium hydroxide, (2) contacting said mixture with an oxidizing gas at a temperature of from about 350° F. to about 450° F., to effect oxidation of said oil and reaction of said calcium hydroxide with the oxidized oil, (3) continuing said reaction for a time sufficient to effect the reaction of from about 5% to about 85% of the calcium hydroxide with the oxidized oil, (4) subjecting the resulting reaction mixture to filtration to remove unreacted calcium hydroxide therefrom, (5) adding to the filtrate from step 4, from about 2% to about 10% of water and from about 2.0% to about 25% of calcium hypochlorite, based on the weight of said filtrate from step 4, at a temperature below the boiling point of water, (6) substantially completely dehydrating the mixture from step 5 and (7) subjecting the dehydrated mixture to filtration to separate the complex calcium salt.

8. A mineral lubricating oil containing a minor amount, sufficient to improve the detergent character thereof, of a complex calcium salt of an oxidized petroleum oil produced by the process which comprises (1) forming a mixture comprising (a) a petroleum oil having an average molecular weight of from about 300 to about 1000 and (b) from about 2% to about 25%, based on the weight of said oil, of calcium hydroxide, (2) contacting said mixture with an oxidizing gas at a temperature of from about 250° F. to about 600° F., to effect oxidation of said oil and reaction of the calcium hydroxide with the oxidized oil, (3) continuing said oxidation for a time sufficient to effect the reaction of from about 5% to about 85% of the calcium hydroxide with the oxidized oil, (4) providing a mixture comprising (a) the oxidized oil-calcium hydroxide reaction product from step 3, (b) from about 2.0% to about 25%, based on the weight of the oxidized oil-calcium hydroxide reaction product from step 3, of a calcium salt reagent, selected from the group consisting of calcium chloride, calcium hypochlorite and a mixture of calcium chloride and calcium hydroxide containing at least about 25% of calcium chloride and (c) water, at a temperature below the boiling point of water, (5) substantially completely dehydrating the mixture provided in step 4, and (6) subjecting the dehydrated mixture to filtration to separate the complex calcium salt product.

9. A complex calcium salt of an oxidized petroleum oil produced by the process which comprises (1) forming a mixture comprising (a) a petroleum oil having an average molecular weight of from about 300 to about 1000 and (b) from about 2% to about 25%, based on the weight of said oil, of calcium hydroxide, (2) contacting said mixture with an oxidizing gas at a temperature of from about 250° F. to about 600° F., to effect oxidation of said oil and reaction of the calcium hydroxide with the oxidized oil, (3) continuing said oxidation for a time sufficient to effect the reaction of from about 5% to about 85% of the calcium hydroxide with the oxidized oil, (4) providing a mixture comprising (a) the oxidized oil-calcium hydroxide reaction product from step 3, (b) from about 2.0% to about 25%, based on the weight of the oxidized oil-calcium hydroxide reaction product from step 3, of a calcium salt reagent, selected from the group consisting of calcium chloride, calcium hypochlorite and a mixture of calcium chloride and calcium hydroxide containing at least about 25% of calcium chloride and (c) water, at a temperature below the boiling point of water, (5) substantially completely dehydrating the mixture provided in step 4, and (6) subjecting the dehydrated mixture to filtration to separate the complex calcium salt product.

References Cited in the file of this patent

UNITED STATES PATENTS

| | | |
|---|---|---|
| 2,008,490 | Dietrich | July 16, 1935 |
| 2,274,057 | Gerlicher | Feb. 24, 1942 |
| 2,467,176 | Zimmer et al. | Apr. 12, 1949 |
| 2,616,905 | Asseff | Nov. 4, 1952 |
| 2,682,553 | Kirk et al. | June 29, 1954 |
| 2,695,910 | Asseff | Nov. 30, 1954 |